US012620675B2

(12) United States Patent
Matsumine et al.

(10) Patent No.: US 12,620,675 B2
(45) Date of Patent: May 5, 2026

(54) SEPARATOR INCLUDING MIXED LAYER OF HEAT-RESISTANT RESIN AND POROUS POLYOLEFIN FILM, AND NONAQUEOUS ELECTROLYTE SECONDARY BATTERY INCLUDING THE SAME

(71) Applicant: Sumitomo Chemical Company, Limited, Tokyo (JP)

(72) Inventors: Riku Matsumine, Niihama (JP); Akihiko Shin, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 510 days.

(21) Appl. No.: 18/117,094

(22) Filed: Mar. 3, 2023

(65) Prior Publication Data

US 2023/0282940 A1    Sep. 7, 2023

(30) Foreign Application Priority Data

Mar. 4, 2022    (JP) ................................. 2022-033934

(51) Int. Cl.
| | |
|---|---|
| *H01M 50/451* | (2021.01) |
| *H01M 50/417* | (2021.01) |
| *H01M 50/423* | (2021.01) |
| *H01M 50/434* | (2021.01) |
| *H01M 50/446* | (2021.01) |
| *H01M 50/489* | (2021.01) |

(52) U.S. Cl.
CPC ....... *H01M 50/451* (2021.01); *H01M 50/417* (2021.01); *H01M 50/423* (2021.01); *H01M*

*50/434* (2021.01); *H01M 50/446* (2021.01); *H01M 50/489* (2021.01)

(58) Field of Classification Search
CPC ............. H01M 50/451; H01M 50/489; H01M 50/417; H01M 50/446; H01M 50/423; H01M 50/434
USPC ........................................ 429/144, 251, 254
See application file for complete search history.

(56) References Cited

U.S. PATENT DOCUMENTS

| | | | |
|---|---|---|---|
| 2011/0165469 A1 | 7/2011 | Nishikawa | |
| 2011/0195294 A1 | 8/2011 | Lee et al. | |
| 2014/0178741 A1* | 6/2014 | Hasegawa | ........... H01M 50/426 |
| | | | 429/144 |
| 2015/0372276 A1 | 12/2015 | Mizuno et al. | |
| 2017/0279102 A1 | 9/2017 | Hasegawa et al. | |
| 2018/0083249 A1 | 3/2018 | Hasegawa et al. | |

(Continued)

FOREIGN PATENT DOCUMENTS

| | | | | |
|---|---|---|---|---|
| CN | 108878745 A | * | 11/2018 | ............. H01M 50/46 |
| CN | 110323396 A | * | 10/2019 | ........ H01M 10/0525 |

(Continued)

*Primary Examiner* — Sean P Cullen

(74) *Attorney, Agent, or Firm* — Panitch Schwarze Belisario & Nadel LLP

(57) ABSTRACT

As a nonaqueous electrolyte secondary battery separator which has excellent heat resistance and excellent battery performance, provided is a nonaqueous electrolyte secondary battery separator including a mixed layer which contains a heat-resistant resin and a porous base material that includes a polyolefin porous film, in the mixed layer, a weight ratio ($W_1/W_0$) between a weight $W_1$ of the heat-resistant resin and a weight $W_0$ of the porous base material being not less than 0.07.

8 Claims, 1 Drawing Sheet

(56)                    References Cited

U.S. PATENT DOCUMENTS

| | | | |
|---|---|---|---|
| 2020/0335757 A1 * | 10/2020 | Horie .................. | H01M 50/417 |
| 2020/0358066 A1 | 11/2020 | Kai et al. | |
| 2021/0287122 A1 | 9/2021 | Nomura et al. | |

FOREIGN PATENT DOCUMENTS

| | | | | |
|---|---|---|---|---|
| CN | 111081944 A | * | 4/2020 | .......... H01M 50/449 |
| JP | 2009021265 A | | 1/2009 | |
| JP | 2013-46998 A | | 3/2013 | |
| JP | 2013-511818 A | | 4/2013 | |
| JP | 2020030686 A | | 2/2020 | |
| JP | 2020175331 A | | 10/2020 | |
| WO | 2014126079 A1 | | 8/2014 | |
| WO | 2019/107219 A1 | | 6/2019 | |

* cited by examiner

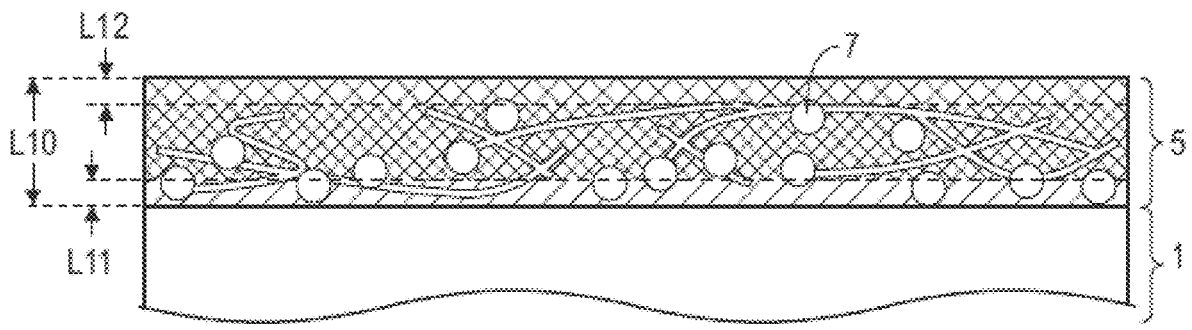

SEPARATOR INCLUDING MIXED LAYER OF HEAT-RESISTANT RESIN AND POROUS POLYOLEFIN FILM, AND NONAQUEOUS ELECTROLYTE SECONDARY BATTERY INCLUDING THE SAME

This Nonprovisional application claims priority under 35 U.S.C. § 119 on Patent Application No. 2022-033934 filed in Japan on Mar. 4, 2022, the entire contents of which are hereby incorporated by reference.

TECHNICAL FIELD

The present invention relates to a separator for a non-aqueous electrolyte secondary battery (hereinafter referred to as a "nonaqueous electrolyte secondary battery separator"), a member for a nonaqueous electrolyte secondary battery (hereinafter referred to as a "nonaqueous electrolyte secondary battery member"), and a nonaqueous electrolyte secondary battery.

BACKGROUND ART

Nonaqueous electrolyte secondary batteries such as lithium secondary batteries are currently in wide use as (i) batteries for devices such as personal computers, mobile telephones, and portable information terminals or (ii) on-vehicle batteries.

As separators for the nonaqueous electrolyte secondary batteries, known are separators the heat resistance of each of which is improved by causing a part of a resin, which constitutes a heat-resistant layer formed on a porous film containing polyolefin as a main component, to penetrate into a part of the porous film (for example, Patent Literatures 1 to 3).

CITATION LIST

Patent Literature

[Patent Literature 1]
    Published Japanese Translation of PCT International Application Tokuhyo No. 2013-511818
[Patent Literature 2]
    Japanese Patent Application Publication Tokukai No. 2013-46998
[Patent Literature 3]
    Pamphlet of PCT International Publication No. WO 2019/107219

SUMMARY OF INVENTION

Technical Problem

However, in each of the above conventional separators, a degree of penetration of the resin, which constitutes the heat-resistant layer, into the porous film is suppressed, from the viewpoint of ensuring a good shutdown characteristic and preventing an excessive increase in resistance. Therefore, the conventional separators each have a problem that the heat resistance is insufficient particularly in a region in which a weight per unit area is low and a problem that there is room for improvement in safety. Furthermore, in each of the conventional separators, there is also room for improvement in battery performance, such as ion permeability and a resistance maintaining property in a coin cell.

The object of an aspect of the present invention is to provide a nonaqueous electrolyte secondary battery separator which has more excellent heat resistance and also more excellent battery performance, such as ion permeability and a resistance maintaining property in a coin cell, than conventional separators.

Solution to Problem

The inventors of the present invention found that the heat resistance of each of the separators can be more improved by improving the degree of penetration of the resin, which constitutes the heat-resistant layer, into the porous film. The inventors of the present invention also found that the ion permeability and the resistance, which had been predicted to significantly deteriorate, did not deteriorate more than predicted. As a result, the inventors of the present invention conceived of the present invention.

The present invention includes the following aspects <1> to <10>.

<1> A nonaqueous electrolyte secondary battery separator including
    a mixed layer which contains a heat-resistant resin and a porous base material that includes a porous film containing a polyolefin-based resin as a main component,
    in the mixed layer, a weight ratio ($W_1/W_0$) between a weight $W_1$ of the heat-resistant resin and a weight $W_0$ of the porous base material being not less than 0.07.

<2> The nonaqueous electrolyte secondary battery separator as described in <1>, wherein a shutdown temperature of the nonaqueous electrolyte secondary battery separator is not lower than 150° C.

<3> The nonaqueous electrolyte secondary battery separator as described in <1> or <2>, wherein a heat-resistant layer which contains the heat-resistant resin is formed on the mixed layer.

<4> The nonaqueous electrolyte secondary battery separator as described in <3>, wherein the heat-resistant layer further contains a filler.

<5> The nonaqueous electrolyte secondary battery separator as described in <4>, wherein an amount of the filler contained in the heat-resistant layer is not less than 20% by weight and not more than 90% by weight, relative to a total weight of the heat-resistant layer.

<6> The nonaqueous electrolyte secondary battery separator as described in any one of <3> to <5>, wherein a value, represented by the following expression (1), of the heat-resistant layer is not less than 5%:

$$\text{a luminance } X_1(\%) - \text{a luminance } X_2(\%) \tag{1}$$

where the luminance $X_1$ indicates an average value of luminances of a part from an interface between the heat-resistant layer and the mixed layer to a depth of 20% of a thickness of the heat-resistant layer from the interface,
    the luminance $X_2$ indicates an average value of luminances of a part from an outermost surface of the heat-resistant layer to a depth of 20% of the thickness of the heat-resistant layer from the outermost surface, and
    an average value of luminances of the entire heat-resistant layer is 100%.

<7> The nonaqueous electrolyte secondary battery separator as described in any one of <1> to <6>, wherein an air permeability of the nonaqueous electrolyte secondary battery separator is not more than 500 sec/100 mL.

<8> The nonaqueous electrolyte secondary battery separator as described in any one of <1> to <7>, wherein the heat-resistant resin is an aramid resin.

<9> A nonaqueous electrolyte secondary battery member including:

a positive electrode;

a nonaqueous electrolyte secondary battery separator described in any one of <1> to <8>; and a negative electrode, the positive electrode, the nonaqueous electrolyte secondary battery separator, and the negative electrode being disposed in this order.

<10> A nonaqueous electrolyte secondary battery including a nonaqueous electrolyte secondary battery separator described in any one of <1> to <8>.

Advantageous Effects of Invention

A nonaqueous electrolyte secondary battery separator in accordance with an embodiment of the present invention has the effect of having more excellent heat resistance and also more excellent battery performance, such as ion permeability and a resistance maintaining property in a coin cell, than conventional separators.

BRIEF DESCRIPTION OF DRAWINGS

The FIGURE is a schematic view illustrating an outline of an example structure of a heat-resistant layer which further contains a filler in accordance with an embodiment of the present invention.

DESCRIPTION OF EMBODIMENTS

The following description will discuss embodiments of the present invention. Note, however, that the present invention is not limited to the embodiments. The present invention is not limited to arrangements described below, but may be altered in various ways by a skilled person within the scope of the claims. The present invention also encompasses, in its technical scope, any embodiment derived by combining technical means disclosed in differing embodiments. Note that any numerical range expressed as "A to B" herein means "not less than A and not more than B" unless otherwise stated.

Herein, the term "machine direction" (MD) refers to a direction in which a polyolefin resin composition in sheet form and a porous film are conveyed in the below-described method of producing a porous film. The term "transverse direction" (TD) refers to a direction which is (i) perpendicular to the MD and (ii) parallel to a surface of the polyolefin resin composition in sheet form and a surface of the porous film.

Embodiment 1: Nonaqueous Electrolyte Secondary Battery Separator

A nonaqueous electrolyte secondary battery separator in accordance with an embodiment of the present invention (hereinafter simply referred to as "separator") includes a mixed layer which contains a heat-resistant resin and a porous base material that includes a porous film containing a polyolefin-based resin as a main component. In the mixed layer, a weight ratio ($W_1/W_0$) between a weight $W_1$ of the heat-resistant resin and a weight $W_0$ of the porous base material is not less than 0.07.

The "mixed layer" can be formed, for example, by causing the heat-resistant resin to penetrate into the porous base material through one or both surfaces out of surfaces of the porous base material. For example, when the heat-resistant resin is caused to penetrate into a part of the porous base material, the separator has the mixed layer and a part which is constituted only by the porous base material. Herein, the "part which is constituted only by the porous base material" of the separator is referred to as "residual porous base material". On the other hand, for example, when the heat-resistant resin is caused to penetrate into all the parts of the porous base material, the separator has the mixed layer and does not have the residual porous base material.

The weight ratio in the mixed layer (hereinafter simply referred to as "weight ratio") is a parameter indicative of the amount of the heat-resistant resin contained in the mixed layer. The separator includes the porous base material which contains the heat-resistant resin in a larger amount than in a conventional separator.

In the separator, the mixed layer contains the heat-resistant resin in a specific amount or more, and therefore has the above weight ratio. This causes an improvement in heat resistance of the porous base material, and ultimately causes an improvement also in heat resistance of the entire nonaqueous electrolyte secondary battery separator.

When the mixed layer has the above weight ratio, it is predicted that, if a hole(s) in the porous base material is/are blocked by the heat-resistant resin, ion permeability will significantly deteriorate and a resistance will greatly increase. However, contrary to such prediction, it was found that, even in such a case, the separator retains good ion permeability and a good resistance. This is assumed to be because, since the heat-resistant resin is contained along fibrils of the polyolefin-based resin, which constitutes the porous base material, in the separator, the hole(s) in the porous base material is/are unlikely to be blocked. As a result, it is considered that the separator retains good ion permeability and a good resistance.

The "weight ratio" is not less than 0.07, and preferably not less than 0.10, from the viewpoint of suitably improving the heat resistance of the separator. When the mixed layer contains an excess amount of the heat-resistant resin, the hole(s) in the porous base material is/are likely to be blocked by the heat-resistant resin. Thus, the "weight ratio" is preferably not more than 0.70, and more preferably not more than 0.50.

A method of calculating the "weight ratio" can be, for example, a method as shown in (a) to (d) below.

(a) When the separator is one in which a heat-resistant layer (described later) is formed, the heat-resistant layer is peeled off.

(b) When the separator obtained in (a) or the separator in which the heat-resistant layer is not formed does not include the residual porous base material, the weight of the mixed layer is measured as $W_2$. When these separators each include the residual porous base material, the total weight of the mixed layer and the residual porous base material is measured as $W_2$.

(c) A difference ($W_2-W_0$) between $W_2$ measured in (b) and the weight: $W_0$ of the porous base material is calculated as the weight: $W_1$ of the heat-resistant resin in the mixed layer.

(d) The weight ratio ($W_1/W_0$) is calculated from the weight: $W_0$ of the porous base material and $W_1$ calculated in (c).

Note that, in (c), the weight: $W_0$ of the porous base material may be measured in advance before the mixed layer is formed. Alternatively, the weight: $W_0$ of the porous base material may be measured after the mixed layer is cleaned with use of a cleaning liquid so that the heat-resistant resin is removed. Note also that, in each of (b) to (d), a value of a weight per unit area can be used instead of the weight.

The cleaning liquid is not limited to any particular one, provided that the cleaning liquid causes the heat-resistant resin to dissolve therein and does not cause the polyolefin to dissolve therein. The cleaning liquid can be, for example, hydrochloric acid and concentrated sulfuric acid.

[Porous Base Material]

The porous base material in an embodiment of the present invention will be described below. Note that the mere term "porous base material" means a porous base material which does not contain a heat-resistant resin.

The porous base material includes a polyolefin porous film. Note that the polyolefin porous film is a porous film which contains a polyolefin-based resin as a main component. Note that the phrase "contains a polyolefin-based resin as a main component" means that the porous film contains the polyolefin-based resin at a proportion of not less than 50% by volume, preferably not less than 90% by volume, and more preferably not less than 95% by volume, relative to the total volume of materials of which the porous film is made.

The porous base material has therein many pores connected to one another. This allows a gas and a liquid to pass through the porous base material from one side to the other side.

The porous base material has a thickness of preferably 5 μm to 20 μm, more preferably 7 μm to 15 μm, and still more preferably 8 μm to 15 μm. The porous base material having a thickness of not less than 5 μm can sufficiently have functions (such as a shutdown function) which the separator is required to have. The porous base material having a thickness of not more than 20 μm allows the separator to be thinner.

The polyolefin-based resin more preferably contains a high molecular weight component having a weight-average molecular weight of $5 \times 10^5$ to $15 \times 10^6$. In particular, the polyolefin-based resin more preferably contains a high molecular weight component having a weight-average molecular weight of not less than 1,000,000, because the strength of each of the obtained porous base material and the nonaqueous electrolyte secondary battery separator including the porous base material is improved.

The polyolefin-based resin is not limited to any particular one. Examples of the polyolefin-based resin can include: homopolymers which are each obtained by polymerizing a single monomer selected from monomers such as ethylene, propylene, 1-butene, 4-methyl-1-pentene, and 1-hexene; and copolymers which are each obtained by polymerizing two or more monomers selected from such monomers.

Examples of the homopolymers include polyethylene, polypropylene, and polybutene. Examples of the copolymers include an ethylene-propylene copolymer.

As the polyolefin-based resin, polyethylene is more preferable. Examples of the polyethylene include low-density polyethylene, high-density polyethylene, linear polyethylene (ethylene-α-olefin copolymer), and ultra-high molecular weight polyethylene having a weight-average molecular weight of not less than 1,000,000. Among these examples, ultra-high molecular weight polyethylene having a weight-average molecular weight of not less than 1,000,000 is still more preferable.

The porous base material typically has a weight per unit area of preferably 2 g/m² to 20 g/m², and more preferably 5 g/m² to 12 g/m² so as to allow a battery to have a high weight energy density and a high volume energy density.

The porous base material has an air permeability of preferably 30 sec/100 mL to 500 sec/100 mL, and more preferably 50 sec/100 mL to 300 sec/100 mL, in terms of a Gurley value, from the viewpoint of exhibiting sufficient ion permeability.

The porous base material has a porosity of preferably 20% by volume to 80% by volume, and more preferably 30% by volume to 75% by volume, so as to (i) retain an increased amount of an electrolyte and (ii) obtain the function of reliably preventing (shutting down) a flow of an excessively large electric current at a lower temperature.

The pores in the porous base material each have a pore diameter of preferably not more than 0.1 μm and more preferably not more than 0.06 μm, from the viewpoint of achieving sufficient ion permeability and preventing particles which constitute an electrode from entering the pores.

[Method of Producing Porous Base Material]

In an embodiment of the present invention, a method of producing the porous base material is not limited to particular one, and any publicly known method can be employed. For example, as disclosed in Japanese Patent No. 5476844, a method can be employed which involves adding a filler to a thermoplastic resin, forming a resulting mixture into a film, and then removing the filler.

Specifically, when, for example, the polyolefin porous film is made of the polyolefin-based resin which contains an ultra-high molecular weight polyethylene and a low molecular weight polyolefin that has a weight-average molecular weight of not more than 10,000, the porous base material is preferably produced by, from the viewpoint of production costs, a method including the following steps (1) through (4):

(1) kneading 100 parts by weight of an ultra-high molecular weight polyethylene, 5 parts by weight to 200 parts by weight of a low molecular weight polyolefin which has a weight-average molecular weight of not more than 10,000, and 100 parts by weight to 400 parts by weight of an inorganic filler such as calcium carbonate to obtain a polyolefin-based resin composition;

(2) forming the polyolefin-based resin composition into a sheet;

(3) removing the inorganic filler from the sheet obtained in the step (2); and (4) stretching the sheet obtained in the step (3). Alternatively, the porous base material may be produced by a method disclosed in any of the above-listed Patent Literatures.

The polyolefin porous film may be alternatively a commercially available product which has the above-described characteristics.

[Mixed Layer]

The mixed layer in an embodiment of the present invention is a layer which contains the porous base material and the heat-resistant resin. Thus, the mixed layer contains the heat-resistant resin and the polyolefin-based resin which is a component that constitutes the porous base material.

In an embodiment of the present invention, the entire porous base material may be contained in the mixed layer or alternatively a part of the porous base material may be contained in the mixed layer. Specifically, the separator may or may not include the residual porous base material. The mixed layer can be formed by causing the heat-resistant resin to penetrate into the porous base material through one or both surfaces of the porous base material (described later). Note, here, that, for example, when the mixed layer is formed by causing the heat-resistant resin to penetrate into the porous base material through one surface of the porous base material, the separator can have (i) the mixed layer on a side on which the one surface of the porous base material, through which the heat-resistant resin has been caused to penetrate into the porous base material, is located and (ii) the residual porous base material on a side which faces the side. Note also that, for example, when the mixed layer is formed by causing the heat-resistant resin to penetrate into the porous base material through both surfaces of the porous base material, the separator can have (i) two mixed layers on respective sides on which the both surfaces of the porous base material, through which the heat-resistant resin has been caused to penetrate into the porous base material, are located and (ii) the residual porous base material in a middle part of the separator.

The percent by volume of the mixed layer is represented by a proportion of the volume of the part of the porous base material which is contained in the mixed layer, relative to the total volume of the porous base material. The percent by volume of the mixed layer is preferably not less than 5.0% by volume, and more preferably not less than 7.0% by volume, relative to the total volume of the porous base material, from the viewpoint of improving the heat resistance of the separator. The upper limit of the volume of the mixed layer is 100% by volume, relative to the total volume of the porous base material. From the viewpoint of the ion permeability and a resistance of the separator, the upper limit is preferably not more than 55% by volume, and more preferably not more than 40% by volume, relative to the total volume of the porous base material.

The heat-resistant resin is a resin which has more excellent heat resistance than the polyolefin. In an embodiment of the present invention, the separator has the mixed layer. Therefore, it is possible to improve the heat resistance of the separator.

It is preferable that the heat-resistant resin be insoluble in an electrolyte of a battery and be electrochemically stable when the battery is in normal use.

Examples of the heat-resistant resin include nitrogen-containing aromatic polymers; (meth)acrylate-based resins; fluorine-containing resins; polyester-based resins; rubbers; resins having a melting point or a glass transition temperature of not lower than 180° C.; water-soluble polymers; and polycarbonate, polyacetal, and polyether ether ketone.

Examples of the nitrogen-containing aromatic polymers include aromatic polyamide, aromatic polyimide, aromatic polyamide imide, polybenzimidazole, polyurethane, and melamine resin. Examples of the aromatic polyamide include wholly aromatic polyamide (aramid resin) and semi-aromatic polyamide. Examples of the aromatic polyamide include para-aramid and meta-aramid. Among the above nitrogen-containing aromatic polymers, wholly aromatic polyamide is preferable, and para-aramid is more preferable.

Herein, "para-aramid" indicates wholly aromatic polyamide in which amide bonds are present at para positions or quasi-para positions of aromatic rings. Note that "quasi-para positions" indicate positions which are located on opposite sides of aromatic rings and which are located coaxially or in parallel to each other. Examples of such positions include positions 4 and 4' of a biphenylene ring, positions 1 and 5 of a naphthalene ring, and positions 2 and 6 of a naphthalene ring.

Specific examples of the para-aramid include poly(paraphenylene terephthalamide), poly(parabenzamide), poly(4, 4'-benzanilide terephthalamide), poly(paraphenylene-4,4'-biphenylene dicarboxylic acid amide), poly(paraphenylene- 2,6-naphthalene dicarboxylic acid amide), poly(2-chloro-paraphenylene terephthalamide), and a paraphenylene terephthalamide/2,6-dichloroparaphenylene terephthalamide copolymer. Among the above examples of the para-aramid, poly(paraphenylene terephthalamide) is preferable because poly(paraphenylene terephthalamide) is easy to produce and handle.

Examples of the fluorine-containing resins include polyvinylidene fluoride (PVDF), polytetrafluoroethylene, a vinylidene fluoride-hexafluoropropylene copolymer, a tetrafluoroethylene-hexafluoropropylene copolymer, a tetrafluoroethylene-perfluoroalkyl vinyl ether copolymer, a vinylidene fluoride-tetrafluoroethylene copolymer, a vinylidene fluoride-trifluoroethylene copolymer, a vinylidene fluoride-trichloroethylene copolymer, a vinylidene fluoride-vinyl fluoride copolymer, a vinylidene fluoride-hexafluoropropylene-tetrafluoroethylene copolymer, and an ethylene-tetrafluoroethylene copolymer. Particular examples of the fluorine-containing resins include fluorine-containing rubber having a glass transition temperature of not higher than 23° C.

Preferable examples of the polyester-based resins include aromatic polyester, such as polyarylate, and liquid crystal polyester.

Examples of the rubbers include a styrene-butadiene copolymer and a hydride thereof, a methacrylate ester copolymer, an acrylonitrile-acrylic ester copolymer, a styrene-acrylic ester copolymer, ethylene propylene rubber, and polyvinyl acetate.

Examples of the resins having a melting point or a glass transition temperature of not lower than 180° C. include polyphenylene ether, polysulfone, polyether sulfone, polyphenylene sulfide, polyetherimide, polyamide imide, and polyether amide.

Examples of the water-soluble polymers include polyvinyl alcohol, polyethylene glycol, cellulose ether, sodium alginate, polyacrylic acid, polyacrylamide, and polymethacrylic acid.

Note that, as the heat-resistant resin, only one type of resin may be used or two or more types of resins may be alternatively used in combination.

The molecular weight of the heat-resistant resin is preferably 1.0 dL/g to 2.5 dL/g, and more preferably 1.2 dL/g to 2.0 dL/g, in terms of an intrinsic viscosity. When the molecular weight of the heat-resistant resin is less than 1.0 dL/g, there is a possibility that improvement in heat resistance of the mixed layer is not seen. When the molecular weight of the heat-resistant resin is more than 2.5 dL/g, the heat-resistant resin does not easily penetrate into the interior of the porous base material.

The weight per unit area, the air permeability, and the porosity of the mixed layer and the pore diameter of pores in the mixed layer preferably fall within the same ranges as the preferable ranges of the weight per unit area, the air permeability, and the porosity of the porous base material and the pore diameter of the pores in the porous base material.

[Method of Producing Mixed Layer]

A method of producing the mixed layer is not limited to any particular one, and can be, for example, a method which involves applying a coating solution containing the heat-resistant resin to one or both surfaces of the porous base material, causing the coating solution to penetrate into at least a part of the interior of the porous base material, and then removing a solvent contained in the coating solution.

In so doing, the coating solution may be caused to penetrate into the entire interior of the porous base material or the coating solution may be caused to penetrate into a part of the interior of the porous base material. A case in which the coating solution is caused to penetrate into the entire interior of the porous base material refers to a case in which the residual porous base material is not present. A case in which the coating solution is caused to penetrate into a part of the interior of the porous base material refers to a case in which the residual porous base material is present.

Note here that the coating solution which does not penetrate into the interior of the porous base material can form a coating layer on one or both surfaces of the mixed layer. By removing the solvent contained in the coating solution, a heat-resistant layer (described later) can be formed on the one or both surfaces of the mixed layer. Therefore, the separator can be configured such that the heat-resistant layer is formed on the mixed layer.

Before the coating solution is applied to one or both surfaces of the porous base material, the one or both surfaces of the porous base material can be subjected to a hydrophilization treatment as necessary.

The coating solution can contain a filler (described later) which can be contained in the heat-resistant layer. The coating solution can be typically prepared by dissolving the heat-resistant resin in the solvent.

When the heat-resistant layer containing the filler is formed on the mixed layer, the coating solution can be typically prepared by, in addition to dissolving the heat-resistant resin in the solvent, dispersing the filler in the solvent. In this case, the solvent serves also as a dispersion medium for dispersing the filler therein.

The heat-resistant resin may be caused to be an emulsion by the solvent.

The solvent is not limited to any particular one, provided that the solvent (i) does not adversely affect the porous base material, (ii) allows the heat-resistant resin to be uniformly and stably dissolved therein, and (iii) allows the filler to be uniformly and stably dispersed therein when the solvent contains the filler. Examples of the solvent include water and organic solvents. As the solvent, only one type of solvent may be used or two or more types of solvents may be alternatively used in combination.

The coating solution may be formed by any method, provided that the coating solution is capable of satisfying conditions, such as a resin solid content (resin concentration) and a fine particle amount, which are necessary to obtain the mixed layer and the heat-resistant layer. Specific examples of a method of forming the coating solution include a mechanical stirring method, an ultrasonic dispersion method, a high-pressure dispersion method, and a media dispersion method. The coating solution may contain, as a component(s) other than the resin heat-resistant resin and fine particles, an additive(s) such as a disperser, a plasticizer, a surfactant, and/or a pH adjustor, provided that the additive(s) does/do not prevent the object of the present invention from being attained. Note that the additive(s) may be contained in an amount(s) that does/do not prevent the object of the present invention from being attained.

The coating solution can be applied to the porous base material by a conventionally known method. Specific examples of such a method include a gravure coater method, a dip coater method, a bar coater method, and a die coater method.

The solvent is generally removed by a drying method. Note also that drying may be carried out after the solvent contained in the coating solution is replaced with another solvent.

In an embodiment of the present invention, for example, by employing one or more of the following production conditions (A) to (C), it is possible to promote penetration of the coating solution into the interior of the porous base material and suitably produce the mixed layer.

(A) When the coating solution is applied to the porous base material, a high-pressure bar is, for example, used so that a working load of preferably not less than 250 N/m, and more preferably not less than 300 N/mm per width of a coating bar is applied to a surface of the porous base material which is to be coated with the coating solution. Note that the working load is calculated as a product of the pressure of the coating solution in a land part (region between an entrance to and an exit from the coating bar for the coating solution) and the solution-wetted area of the land portion.

(B) The solvent is removed by drying in which a drying condition(s) is/are controlled so that a drying time is preferably not shorter than 10 seconds, and more preferably not shorter than 20 seconds.

(C) The amount of the heat-resistant resin contained in the coating solution is controlled to preferably 2.0% by weight to 10.0% by weight, and more preferably 4.5% by weight to 8.0% by weight.

As a method of suppressing the penetration of the heat-resistant resin into the interior of the porous base material, known is an opposite surface impregnation method which involves applying the coating solution to one surface of the porous base material and impregnating, in, for example, a solvent such as N-methyl-2-pyrrolidone (NMP), a surface of the porous base material which is opposite to the surface to which the coating solution is applied. In an embodiment of the present invention, the heat-resistant resin may be caused to penetrate into the entire interior of the porous base material, as described above. Therefore, the mixed layer can be suitably produced also by applying the coating solution to one surface of the porous base material without employing a method such as an opposite surface impregnation method. When the heat-resistant resin is caused to penetrate into a part of the interior of the porous base material, the opposite surface impregnation method or the like may be used as appropriate.

[Heat-Resistant Layer]

As described above, the nonaqueous electrolyte secondary battery separator in accordance with an embodiment of the present invention can include the heat-resistant layer that is formed on the mixed layer.

The heat-resistant layer contains the heat-resistant resin. The heat-resistant layer can also contain the filler. Examples of the filler include organic fine particles and inorganic fine particles. Therefore, when the heat-resistant layer contains the filler, the heat-resistant resin contained in the heat-resistant layer also serves as a binder resin for binding the filler and binding the filler and the mixed layer. The filler is preferably constituted by electrically insulating fine particles. Further, the filler may be a combination of two or more types of fillers which differ from each other in one or more of a constituent material, a particle diameter, and a specific surface area.

Examples of an organic substance which constitutes the organic fine particles include: homopolymers which are each obtained from a monomer selected from monomers such as styrene, vinyl ketone, acrylonitrile, methyl methacrylate, ethyl methacrylate, glycidyl methacrylate, glycidyl acrylate, and methyl acrylate; copolymers which are each obtained from two or more monomers selected from such monomers; fluorine-based resins such as polytetrafluoroethylene, a tetrafluoroethylene-hexafluoropropylene copolymer, a tet-rafluoroethylene-ethylene copolymer, and polyvinylidene fluoride; melamine resin; urea resin; polyolefin; and polymethacrylate. As the organic fine particles, one type of organic fine particles may be used or two or more types of organic fine particles may be alternatively used in combination. The organic fine particles are preferably constituted by polytetrafluoroethylene in light of chemical stability.

Examples of an inorganic substance which constitutes the inorganic fine particles include metal oxide, metal nitride, metal carbide, metal hydroxide, carbonate, and sulfate. Specific examples of the inorganic substance include: powders of aluminum oxide (such as alumina), boehmite, silica, titania, magnesia, barium titanate, aluminum hydroxide, calcium carbonate, and the like; and minerals such as mica, zeolite, kaolin, and talc. As the inorganic fine particles, one type of inorganic fine particles may be used or two or more types of inorganic fine particles may be alternatively used in combination. The inorganic fine particles are preferably constituted by aluminum oxide in light of chemical stability.

The particles of the filler can each have a substantially spherical shape, a plate shape, a columnar shape, a needle shape, a whisker shape, a fibrous shape, or the like. The particles can each have any shape. The filler is preferably constituted by substantially spherical particles, because such particles facilitate formation of uniform pores.

The average particle diameter of the filler is preferably 0.01 µm to 1 µm. Herein, the "average particle diameter of the filler" indicates a volume-based average particle diameter (D50) of the filler. The "D50" means a particle diameter having a value at which a cumulative value reaches 50% in a volume-based particle size distribution. The D50 can be measured with use of, for example, a laser diffraction particle size analyzer (product names: SALD2200, SALD2300, etc., manufactured by Shimadzu Corporation).

The amount of the filler contained in the heat-resistant layer is preferably 20% by weight to 90% by weight, and more preferably 40% by weight to 80% by weight, relative to the total weight of the heat-resistant layer. When the amount of the filler contained in the heat-resistant layer falls within the above range, the resulting heat-resistant layer has sufficient ion permeability.

The heat-resistant layer has an air permeability of preferably not more than 400 sec/100 mL, and more preferably not more than 200 sec/100 mL, in terms of a Gurley value.

A value, represented by the following expression (1), of the heat-resistant layer is preferably not less than 5%, and more preferably not less than 7%. The upper limit of the value is not limited to any particular one, and is, for example, not more than 60%, preferably not more than 50%, and more preferably not more than 11%.

$$A \text{ luminance } X_1(\%) - a \text{ luminance } X_2(\%) \qquad \text{expression (1)}$$

where the luminance $X_1$ indicates an average value of luminances of a part from an interface between the heat-resistant layer and the mixed layer to a depth of 20% of a thickness of the heat-resistant layer from the interface, the luminance $X_2$ indicates an average value of luminances of a part from an outermost surface of the heat-resistant layer to a depth of 20% of the thickness of the heat-resistant layer from the outermost surface, and an average value of luminances of the entire heat-resistant layer is 100%. Note, here, that the outermost surface of the heat-resistant layer indicates a surface of the heat-resistant layer which faces the interface between the heat-resistant layer and the mixed layer.

The value represented by expression (1) indicates, in a thickness direction of the heat-resistant layer, non-uniformity of the concentration of a substance(s) constituting the heat-resistant layer. The substance constituting the heat-resistant layer is the heat-resistant resin. When the heat-resistant layer further contains the filler, the substances constituting the heat-resistant layer are the heat-resistant resin and the filler. When the value falls within the above preferable range, the heat-resistant layer contains the substance(s), constituting the heat-resistant layer, in a larger amount(s) in a region close to the mixed layer than in a region distant from the mixed layer. In this case, a larger amount(s) of the heat-resistant resin (or the heat-resistant resin and the filler), which is/are the substance(s) constituting the heat-resistant layer, is/are moved to the region close to the mixed layer in the heat-resistant layer. As a result, it is considered that the mixed layer contains the heat-resistant resin in an amount suitable to impart sufficient heat resistance to the separator.

The above average values of the luminances can be measured by the same method as that described in Examples below.

[Method of Producing Heat-Resistant Layer]

The heat-resistant layer can be formed simultaneously with formation of the mixed layer. Namely, a method of producing the heat-resistant layer is the same as the method of producing the mixed layer.

When the coating solution contains the filler, the filler typically has a particle diameter larger than the pore diameter of the hole(s) in the porous base material. Therefore, when the heat-resistant layer and the mixed layer are produced, the filler settles on the mixed layer without penetrating into the interior of the porous base material. Therefore, after the solvent is removed, a filler-rich layer, which contains the filler in a large amount, can be formed on the mixed layer. Note, here, that the filler-rich layer is a part of the heat-resistant layer. In other words, the heat-resistant layer can be configured to include (i) the filler-rich layer which is formed on the mixed layer and (ii) a layer which is formed on the filler-rich layer and which is constituted by the heat-resistant resin or contains the heat-resistant resin and a small amount of the filler even when the layer contains the filler.

Therefore, the separator can have a structure in which the filler-rich layer is present between the mixed layer and the layer which is constituted by the heat-resistant resin or contains the heat-resistant resin and a small amount of the filler even when the layer contains the filler.

Here, an example structure of the heat-resistant layer which further contains the filler will be described with reference to the FIGURE. A separator illustrated in the FIGURE has a structure in which a heat-resistant layer 5 is formed on a mixed layer in a laminated body 1 which is constituted by a residual porous base material and the mixed layer. A filler 7 contained in the heat-resistant layer 5 is distributed in a large amount in a vicinity of the mixed layer in the laminated body 1. On the contrary, the filler 7 is distributed in a small amount in a place distant from the mixed layer in the laminated body 1. Therefore, the separator illustrated in the FIGURE has a structure in which the filler-rich layer is present between the mixed layer and the layer which contains the heat-resistant resin and a small amount of the filler.

In the FIGURE, an arrow L10 indicates the total thickness of the heat-resistant layer 5. The length of each of an arrow L11 and an arrow L12 is 20% of the arrow L10. Therefore, in the heat-resistant layer 5 illustrated in the FIGURE, a luminance X1 is an average luminance of a part in which diagonal lines are drawn, and a luminance X2 is an average luminance of a part in which crossed diagonal lines are drawn.

[Physical Properties of Nonaqueous Electrolyte Secondary Battery Separator]

The separator preferably has a shutdown temperature of not lower than 150° C.

A method of measuring the shutdown temperature is not limited to a particular one. The shutdown temperature can be measured by, for example, a method described in Examples.

The separator has a thickness of preferably 5.0 μm to 45 μm, and more preferably 6 μm to 25 μm.

The separator has an air permeability of preferably not more than 500 sec/100 mL, and more preferably not more than 300 sec/100 mL, in terms of a Gurley value. When the air permeability falls within the above range, it can be said that the separator has sufficient ion permeability.

The separator may include another porous layer, which is different from the residual porous base material, the mixed layer, and the heat-resistant layer, as necessary, provided that the object of the present invention is not prevented from being attained. Examples of the another porous layer include publicly known porous layers such as another heat-resistant layer, an adhesive layer, and a protective layer.

Embodiment 2: Nonaqueous Electrolyte Secondary Battery Member, Embodiment 3: Nonaqueous Electrolyte Secondary Battery A nonaqueous electrolyte secondary battery member in accordance with Embodiment 2 of the present invention includes a positive electrode, a nonaqueous electrolyte secondary battery separator in accordance with Embodiment 1 of the present invention, and a negative electrode which are disposed in this order.

A nonaqueous electrolyte secondary battery in accordance with Embodiment 3 of the present invention includes a nonaqueous electrolyte secondary battery separator in accordance with Embodiment 1 of the present invention.

The nonaqueous electrolyte secondary battery in accordance with Embodiment 3 of the present invention can be, for example, a nonaqueous secondary battery which achieves an electromotive force through doping with and dedoping of lithium. The nonaqueous electrolyte secondary battery can include a nonaqueous electrolyte secondary battery member which includes a positive electrode, the nonaqueous electrolyte secondary battery separator in accordance with Embodiment 1 of the present invention, and a negative electrode that are formed in this order. Note that constituent elements, other than the nonaqueous electrolyte secondary battery separator, of the nonaqueous electrolyte secondary battery are not limited to those described below.

The nonaqueous electrolyte secondary battery in accordance with Embodiment 3 of the present invention is typically structured such that a battery element is enclosed in an exterior member, the battery element including (i) a structure in which the negative electrode and the positive electrode face each other with the nonaqueous electrolyte secondary battery separator in accordance with Embodiment 1 of the present invention therebetween and (ii) an electrolyte with which the structure is impregnated. The nonaqueous electrolyte secondary battery is particularly preferably a lithium ion secondary battery. Note that the doping means occlusion, support, adsorption, or insertion, and means a phenomenon in which lithium ions enter an active material of an electrode such as a positive electrode.

The nonaqueous electrolyte secondary battery member in accordance with Embodiment 2 of the present invention includes the nonaqueous electrolyte secondary battery separator in accordance with Embodiment 1 of the present invention. Therefore, the nonaqueous electrolyte secondary battery member in accordance with Embodiment 2 of the present invention has the effect of having excellent heat resistance and the effect of making it possible to produce a nonaqueous electrolyte secondary battery which has an excellent resistance. The nonaqueous electrolyte secondary battery in accordance with Embodiment 3 of the present invention includes the nonaqueous electrolyte secondary battery separator in accordance with Embodiment 1 of the present invention. Therefore, the nonaqueous electrolyte secondary battery in accordance with Embodiment 3 of the present invention has the effect of having excellent heat resistance and an excellent resistance.

<Positive Electrode>

The positive electrode in each of the nonaqueous electrolyte secondary battery member in accordance with an embodiment of the present invention and the nonaqueous electrolyte secondary battery in accordance with an embodiment of the present invention is not limited to any particular one, provided that the positive electrode is one that is generally used as a positive electrode of a nonaqueous electrolyte secondary battery. The positive electrode can be, for example, a positive electrode sheet having a structure in which an active material layer, containing a positive electrode active material and a binding agent, is formed on a positive electrode current collector. The active material layer may further contain an electrically conductive agent.

Examples of the positive electrode active material include materials each capable of being doped with and dedoped of lithium ions. Specific examples of the materials include lithium complex oxides each containing at least one transition metal such as V, Mn, Fe, Co, or Ni.

Examples of the electrically conductive agent include carbonaceous materials such as natural graphite, artificial graphite, cokes, carbon black, pyrolytic carbons, carbon fiber, and fired products of organic polymer compounds. As the electrically conductive agent, only one type of electrically conductive agent may be used or two or more types of electrically conductive agents may be used in combination.

Examples of the binding agent include: fluorine-based resins such as polyvinylidene fluoride (PVDF); acrylic resin; and styrene butadiene rubber. Note that the binding agent serves also as a thickener.

Examples of the positive electrode current collector include electric conductors such as Al, Ni, and stainless steel. Among these electric conductors, Al is more preferable because Al is easily processed into a thin film and is inexpensive.

Examples of a method of producing the positive electrode sheet includes: a method which involves pressure-molding the positive electrode active material, the electrically conductive agent, and the binding agent on the positive electrode current collector; and a method which involves (i) forming the positive electrode active material, the electrically conductive agent, and the binding agent into a paste with use of an appropriate organic solvent, (ii) coating the positive electrode current collector with the paste, and (iii) drying and then pressurizing the paste so that the paste is fixed to the positive electrode current collector.

<Negative Electrode>

The negative electrode in each of the nonaqueous electrolyte secondary battery member in accordance with an embodiment of the present invention and the nonaqueous electrolyte secondary battery in accordance with an embodiment of the present invention is not limited to any particular one, provided that the negative electrode is one that is generally used as a negative electrode of a nonaqueous electrolyte secondary battery. The negative electrode can be, for example, a negative electrode sheet having a structure in which an active material layer, containing a negative electrode active material and a binding agent, is formed on a negative electrode current collector. The active material layer may further contain an electrically conductive agent.

Examples of the negative electrode active material include materials each capable of being doped with and dedoped of lithium ions, lithium metal, and lithium alloy. Examples of the materials include carbonaceous materials. Examples of the carbonaceous materials include natural graphite, artificial graphite, cokes, carbon black, and pyrolytic carbons.

Examples of the negative electrode current collector include Cu, Ni, and stainless steel. Cu is more preferable because Cu is not easily alloyed with lithium particularly in a lithium-ion secondary battery and is easily processed into a thin film.

Examples of a method of producing the negative electrode sheet include: a method which involves pressure-molding the negative electrode active material on the negative electrode current collector; and a method which involves (i) forming the negative electrode active material into a paste with use of an appropriate organic solvent, (ii) coating the negative electrode current collector with the paste, and (iii) drying and then pressurizing the paste so that the paste is firmly fixed to the negative electrode current collector. The paste preferably contains the electrically conductive agent and the binding agent.

<Nonaqueous Electrolyte>

The nonaqueous electrolyte in the nonaqueous electrolyte secondary battery in accordance with an embodiment of the present invention is not limited to any particular one, provided that the nonaqueous electrolyte is one that is generally used for a nonaqueous electrolyte secondary battery. For example, a nonaqueous electrolyte obtained by dissolving a lithium salt in an organic solvent can be used. Examples of the lithium salt include $LiClO_4$, $LiPF_6$, $LiAsF_6$, $LiSbF_6$, $LiBF_4$, $LiCF_3SO_3$, $LiN(CF_3SO_2)_2$, $LiC(CF_3SO_2)_3$, $Li_2B_{10}Cl_{10}$, lower aliphatic carboxylic acid lithium salt, and $LiAlCl_4$. As the lithium salt, only one type of lithium salt may be used or two or more types of lithium salts may be used in combination.

Examples of the organic solvent contained in the nonaqueous electrolyte include carbonates, ethers, esters, nitriles, amides, carbamates, sulfur-containing compounds, and fluorine-containing organic solvents each obtained by introducing a fluorine group into any of these organic solvents. As the organic solvent, only one type of organic solvent may be used or two or more types of organic solvents may be used in combination.

EXAMPLES

The following description will discuss embodiments of the present invention in greater detail with reference to Examples and Comparative Examples. Note, however, that the present invention is not limited to Examples below.

[Methods of Measuring Various Physical Properties]

In Examples and Comparative Examples, various physical properties were measured by the following methods.

[Weight Per Unit Area]

A porous base material used in each of Examples and Comparative Examples was cut out into a square piece measuring 8 cm on each side, and the square piece was used as a sample. The weight $W_a$ [g] of the sample was measured. A value of the measured $W_a$ was used to calculate the weight per unit area [g/m²] of the porous base material in accordance with the following expression (2).

$$\text{The weight per unit area of the porous base material}=(W_a)/(0.08\times0.08) \qquad \text{expression (2)}$$

A separator was cut out into a square piece measuring 8 cm on each side, and the square piece was used as a sample. The weight $W_b$ [g] of the sample was measured. Further, a peeling tape was affixed to a surface of the sample on which a heat-resistant layer was formed, and then peeled off so that the heat-resistant layer was peeled off from the separator. In this manner, a laminated body which was constituted by a residual porous base material and a mixed layer was obtained. The weight $W_c$ [g] of the laminated body was measured. Values of the measured $W_b$ and $W_c$ were used to calculate the weight per unit area [g/m²] of the laminated body in accordance with expression (3) below. Further, the weight per unit area of the heat-resistant layer was calculated in accordance with expression (4) below.

$$\text{The weight per unit area of the laminated body}=(W_c)/(0.08\times0.08) \qquad \text{expression (3)}$$

$$\text{The weight per unit area of the heat-resistant layer}=(W_b-W_c)/(0.08\times0.08) \qquad \text{expression (4)}$$

[Weight Ratio in Mixed Layer]

Values of the "weight per unit area of the porous base material" and the "weight per unit area of the laminated body", which were measured by the above methods, were used to measure a "weight ratio in the mixed layer" in accordance with the following expression (5).

$$\text{The weight ratio in the mixed layer}=\{(\text{the weight per unit area of the laminated body})-(\text{the weight per unit area of the porous base material})\}/(\text{the weight per unit area of the porous base material}) \qquad \text{expression (5)}$$

[Shutdown Temperature]

A film measuring 17.5 mmΦ was cut out from the separator obtained in each of Examples and Comparative Examples. The film was impregnated with an electrolyte, sandwiched between two electrodes each made of stainless steel (SUS), and then fixed with use of clips. In this manner, a measurement cell was prepared. As the electrolyte, a nonaqueous electrolyte was used which was obtained by dissolving $LiBF_4$ in a mixed solvent of ethylene carbonate and diethyl carbonate (ethylene carbonate:diethyl carbonate=50% by volume:50% by volume) so that the concentration of $LiBF_4$ became 1.0 mol/L. To both of the electrodes of the measurement cell, a terminal of an impedance analyzer was connected. Thereafter, the measurement cell was placed inside an oven, and the resistance at 1 kHz of the measurement cell was measured while the temperature inside the oven was raised at a rate of 15° C./min. A temperature at which the measured resistance reached the maximum value (however, not more than 30,000Ω) was regarded as a shutdown temperature (SD temperature).

[Average Value of Luminances of Heat-Resistant Layer]

A luminance $X_1$ [%] and a luminance $X_2$ [%] were measured by the following method. Note that the luminance $X_1$ was an average value of luminances of a part from an interface between the heat-resistant layer and the mixed layer to a depth of 20% of a thickness of the heat-resistant layer from the interface, and the luminance $X_2$ was an average value of luminances of a part from an outermost surface of the heat-resistant layer, i.e., a surface of the heat-resistant layer which faced the interface between the heat-resistant layer and the mixed layer, to a depth of 20% of the thickness of the heat-resistant layer from the outermost surface. Note also that an average value of luminances of the entire heat-resistant layer was regarded as 100%.

1. The separator was subjected to electron staining with use of ruthenium tetroxide.

2. Pores in the separator were filled with an epoxy resin, and the epoxy resin was cured.

3. The separator was cut in a direction perpendicular to an MD by an ion milling method (IB-19520 (manufactured by JEOL Ltd.)).

4. A scanning electron microscope (SEM) was used to observe cross sections having appeared and capture an image thereof. In so doing, a magnification was adjusted to the maximum magnification at which a layer of the epoxy resin and the entire cross sections of the heat-resistant layer and the porous base material came within the same field of view. As the SEM, S-4800 (manufactured by Hitachi High-Tech Corporation) was used. The observation was carried out with use of a backscattered electron detector at an acceleration voltage of 2 kV.

5. In regard to the obtained image, a luminance was outputted for each pixel. Luminances thus obtained were averaged in an in-plane direction.

6. Average values of the luminances in the in-plane direction were plotted in a thickness direction to create a luminance profile. The profile was normalized so that the average luminance value of the entire heat-resistant layer was 100% and the average luminance value of a region of the epoxy resin was 0%.

7. For each pixel, a moving average of the luminances for 5 pixels in a direction from the heat-resistant layer toward the mixed layer was calculated.

8. A position at which the slope of the moving average reached the negative maximum in a vicinity of the interface between the heat-resistant layer and the mixed layer was defined as the interface between the heat-resistant layer and the mixed layer.

9. In addition to the steps 7 and 8, a moving average of the luminances for 5 pixels in a direction from the epoxy resin, which was located on an outer side of the heat-resistant layer, toward the heat-resistant layer was calculated for each pixel.

10. A position at which the slope of the moving average reached the positive maximum in a vicinity of an interface between the epoxy resin and the heat-resistant layer was defined as the interface between the epoxy resin and the heat-resistant layer.

11. A region sandwiched between the interfaces defined in the steps 8 and 10 was regarded as the heat-resistant layer. An average value of the luminances of a part from 0% to 20% in the thickness direction from the interface between the heat-resistant layer and the mixed layer was regarded as $X_1$. An average value of the luminances of a part from 0% to 20% in the thickness direction from the interface between the epoxy resin and the heat-resistant layer was regarded as $X_2$.

The measured values of the luminance $X_1$ [%] and the luminance $X_2$ [%] were used to calculate a value represented by the following expression (1).

$$(\text{The luminance } X_1[\%]) - (\text{the luminance } X_2[\%]) \qquad \text{expression (1)}$$

[Air Permeability]

The air permeability (Gurley value) of the separator was measured in accordance with JIS P8117. Subsequently, a peeling tape was affixed to a surface of the separator on which the heat-resistant layer was formed, and then peeled off so that the heat-resistant layer was peeled off from the separator. In this manner, a laminated body which was constituted by the residual porous base material and the mixed layer was obtained. The air permeability (Gurley value) of the laminated body was measured in accordance with JIS P8117.

[Coin Cell Resistance]

A film measuring 17 mmΦ was cut out from the separator obtained in each of Examples and Comparative Examples. The film was impregnated with an electrolyte, sandwiched between two electrodes each made of stainless steel (SUS), and then fixed with use of clips. In this manner, a measurement cell was prepared. As the electrolyte, a nonaqueous electrolyte was used which was obtained by dissolving $LiPF_6$ in a mixed solvent of ethylene carbonate, dimethyl carbonate, and ethyl methyl carbonate (ethylene carbonate: dimethyl carbonate:ethyl methyl carbonate=30% by volume:35% by volume: 35% by volume) so that the concentration of $LiPF_6$ became 0.5 mol/L. To both of the electrodes of the measurement cell, a terminal of an impedance analyzer was connected. Thereafter, a coin cell thus prepared was placed in a constant temperature bath set at 25° C. Subsequently, the solution resistance $r_0$ of the coin cell was measured at a frequency of 1 MHz to 0.1 Hz and a voltage amplitude of 10 mV with use of an alternating-current impedance device FRA (SI1260) and a potentiostat (SI1287), manufactured by Solartron.

[Thermal Shrinkage Rate]

The separator obtained in each of Examples and Comparative Examples was cut out into a square piece measuring 8 cm in length of a width in the MD×8 cm in length of a width in a TD. A square frame measuring 6 cm in length of a width in the MD×6 cm in length of a width in the TD was drawn 1 cm inward from an edge on each side of the above square piece. After A5-size paper (copy paper) was folded in two, the cut-out separator was sandwiched in the paper, and the paper was closed with use of a stapler to obtain a sample.

The sample was placed inside an oven inside which the temperature was set to 200° C., and allowed to stand still for 1 hour. Thereafter, the sample was taken out from the oven, and the length $D_{MD}$ [cm] of the width in the MD of the square frame drawn in the sample and the length $D_{TD}$ [cm] of the width in the TD of the square frame drawn in the sample were measured. Values of the measured $D_{MD}$ and $D_{TD}$ were used to calculate a thermal shrinkage rate in the MD and the TD when the separator was heated at 200° C., in accordance with expressions (6) and (7).

$$\text{The thermal shrinkage rate in the MD } [\%] = \{(6 - D_{MD})/6\} \times 100 \qquad \text{expression (6)}$$

$$\text{The thermal shrinkage rate in the TD } [\%] = \{(6 - D_{TD})/6\} \times 100 \qquad \text{expression (7)}$$

Production Example 1: Preparation of Aramid Resin

Poly(paraphenylene terephthalamide), which was one type of aramid resin, was synthesized by the following method. As a vessel for the synthesis, used was a 3-L separable flask having a stirring blade, a thermometer, a nitrogen inlet pipe, and a powder addition port. The separable flask was sufficiently dried, and then 2,200 g of NMP was introduced into the separable flask. To the separable flask, 151.07 g of a calcium chloride powder was added. The temperature of a mixture of the NMP and the calcium chloride powder was raised to 100° C. so that the calcium chloride powder was completely dissolved. In this manner, a solution A was obtained. The calcium chloride powder was previously vacuum-dried at 200° C. for 2 hours.

Next, the temperature of the solution A was returned to room temperature. To the solution A, 68.23 g of paraphenylenediamine was added, and then was completely dissolved to obtain a solution B. While the temperature of the solution B was maintained at 20° C.±2° C., 124.97 g of terephthalic acid dichloride was added to the solution B in 4 separate portions at approximately 10-minute intervals to obtain a solution C. Thereafter, the solution C was matured for 1 hour in a state where the temperature of the solution C was maintained at 20° C.±2° C., while the solution C was stirred at 150 rpm. As a result, an aramid polymerization solution containing 6% by weight of poly(paraphenylene terephthalamide) was obtained.

Production Example 2: Preparation of Coating Solution (1)

First, 100 g of the aramid polymerization solution was weighed and introduced into a flask. Then, 6.0 g of alumina A (average particle diameter: 13 nm) was added to obtain a dispersion liquid A1. In the dispersion liquid A1, the poly (paraphenylene terephthalamide) and the alumina A were contained at a weight ratio of 1:1. Next, NMP was added to the dispersion liquid A1 so that a solid content became 4.5% by weight. The dispersion liquid A1 to which the NMP had been added was stirred for 240 minutes to obtain a dispersion liquid B1. Note that the "solid content" here refers to the total weight of the poly(paraphenylene terephthalamide) and the alumina A. Next, 0.73 g of calcium carbonate was added to the dispersion liquid B 1. The dispersion liquid B1 to which the calcium carbonate had been added was stirred for 240 minutes so as to be neutralized. A coating solution (1) in a slurry form was prepared by defoaming the neutralized dispersion liquid B1 under reduced pressure.

Production Example 3: Preparation of Coating Solution (2)

First, 100 g of the aramid polymerization solution was weighed and introduced into a flask. Then, 6.0 g of alumina A (average particle diameter: 13 nm) and 6.0 g of alumina B (average particle diameter: 640 nm) were added to obtain a dispersion liquid A2. In the dispersion liquid A2, the poly(paraphenylene terephthalamide), the alumina A, and the alumina B were contained at a weight ratio of 1:1:1. Next, NMP was added to the dispersion liquid A2 so that a solid content became 6.0% by weight. The dispersion liquid A2 to which the NMP had been added was stirred for 240 minutes to obtain a dispersion liquid B2. Note that the "solid content" here refers to the total weight of the poly(paraphenylene terephthalamide), the alumina A, and the alumina B. Next, 0.73 g of calcium carbonate was added to the dispersion liquid B2. The dispersion liquid B2 to which the calcium carbonate had been added was stirred for 240 minutes so as to be neutralized. A coating solution (2) in a slurry form was prepared by defoaming the neutralized dispersion liquid B2 under reduced pressure.

Example 1

As the porous base material, a polyolefin porous film (thickness: 10.5 μm, air permeability: 92 sec/100 mL, weight per unit area: 5.40 g/m²) made of polyethylene was used. The coating solution (1) was applied to one surface of the porous base material with use of a high-pressure bar under the conditions that a clearance was 0.05 mm and a coating speed was 20 mm/min, while a working load of 327 N/m per width of a coating bar was applied to the porous base material. As a result, a coated material was obtained. The obtained coated material was allowed to stand still in an atmosphere at 50° C. and at a relative humidity of 70% for 1 minute so that the poly(paraphenylene terephthalamide) was deposited. Next, the coated material in which the poly(paraphenylene terephthalamide) was deposited was immersed in ion-exchange water so that the calcium chloride and the solvent were removed from the coated material. Subsequently, the coated material from which the calcium chloride and the solvent had been removed was dried at 80° C. to obtain a nonaqueous electrolyte secondary battery separator (1).

Example 2

A nonaqueous electrolyte secondary battery separator (2) was obtained by the same method as in Example 1, except the following (i) and (ii).
(i) The coating solution (2) was used in place of the coating solution (1).
(ii) The porous base material was coated with the coating solution with use of a high-pressure bar under the conditions that a clearance was 0.06 mm and a coating speed was 20 mm/min, while a working load of 327 N/m per width of a coating bar was applied to the porous base material.

Example 3

A nonaqueous electrolyte secondary battery separator (3) was obtained by the same method as in Example 1, except the following (iii) and (iv).
(iii) The coating solution (2) was used in place of the coating solution (1).
(iv) The porous base material was coated with the coating solution with use of a high-pressure bar under the conditions that a clearance was 0.08 mm and a coating speed was 20 mm/min, while a working load of 327 N/m per width of a coating bar was applied to the porous base material.

Comparative Example 1

A nonaqueous electrolyte secondary battery separator (4) was obtained by the same method as in Example 1, except the following (v) to (vii).
(v) As the porous base material, a polyolefin porous film (thickness: 10.8 μm, air permeability: 91 sec/100 mL, weight per unit area: 5.52 g/m²) made of polyethylene was used.
(vi) The porous base material was coated with the coating solution with use of an ordinary bar under the conditions that a clearance was 0.07 mm and a coating speed was 20 mm/min, while a working load of 94 N/m per width of a coating bar was applied to the porous base material.

(vii) The coating was carried out while a surface of the porous base material that was opposite to the surface to which the coating solution was applied was impregnated with NMP.

Comparative Example 2

A nonaqueous electrolyte secondary battery separator (5) was obtained by the same method as in Example 1, except the following (viii) and (ix).

(viii) As the porous base material, a polyolefin porous film (thickness: 10.8 μm, air permeability: 94 sec/100 mL, weight per unit area: 5.56 g/m$^2$) made of polyethylene was used.

(ix) The porous base material was coated with the coating solution with use of a bar coater for manual coating under the conditions that a clearance was 0.05 mm and a coating speed was 5 mm/min, while a working load was substantially not applied to the porous base material.

[Results]

The physical property values etc. of the nonaqueous electrolyte secondary battery separators (1) to (5) produced in Examples 1 to 3 and Comparative Examples 1 and 2 were measured by the above-described methods. Tables 1 and 2 below show the results.

TABLE 1

| | Laminated body | | Heat-resistant layer | |
|---|---|---|---|---|
| | (residual porous base material + mixed layer) | | Value represented | Weight per | Separator SD |
| | Weight per unit area [g/m$^2$] | Air permeability [sec/100 mL] | by expression (1) [%] | unit area [g/m$^2$] | temperature [° C.] |
| Example 1 | 5.9 | 123 | 11 | 1.5 | 150.0 |
| Example 2 | 5.9 | 141 | 8 | 5.4 | 150.0 |
| Example 3 | 6.1 | 174 | 7 | 6.4 | 150.2 |
| Comparative Example 1 | 5.8 | 111 | 2 | 1.6 | 149.5 |
| Comparative Example 2 | 5.9 | 127 | 1 | 1.5 | 147.3 |

TABLE 2

| | Nonaqueous electrolyte secondary battery separator | | | | |
|---|---|---|---|---|---|
| | Mixed layer Weight ratio in mixed | Air permeability | Coin cell resistance | Thermal shrinkage rate at 200° C. [%] | |
| | layer | [sec/100 mL] | [Ω] | MD | TD |
| Example 1 | 0.083 | 167 | 2.9 | 62.8 | 89.3 |
| Example 2 | 0.105 | 267 | 3.8 | 98.7 | 99.2 |
| Example 3 | 0.113 | 326 | 4.2 | 98.8 | 98.9 |
| Comparative Example 1 | 0.053 | 163 | 2.8 | 43.6 | 84.9 |
| Comparative Example 2 | 0.062 | 168 | 2.7 | 53.1 | 69.7 |

As shown in Table 2, the "Weight ratio in mixed layer" of each of the nonaqueous electrolyte secondary battery separators (1) to (3) produced in Examples 1 to 3 is not less than 0.07. On the contrary, the "Weight ratio in mixed layer" of each of the nonaqueous electrolyte secondary battery separators (4) and (5) produced in Comparative Examples 1 and 2 is less than 0.07.

It was found that, since the nonaqueous electrolyte secondary battery separators (1) to (3) were higher in value of the thermal shrinkage rate at 200° C., the nonaqueous electrolyte secondary battery separators (1) to (3) had more excellent heat resistance than the nonaqueous electrolyte secondary battery separators (4) and (5). Furthermore, it was found that, since the nonaqueous electrolyte secondary battery separators (1) to (3) were equivalent in values of the air permeability and the coin cell resistance to the nonaqueous electrolyte secondary battery separators (4) and (5), the nonaqueous electrolyte secondary battery separators (1) to (3) had favorable ion permeability and a favorable resistance maintaining property in a coin cell.

As such, it was found that a nonaqueous electrolyte secondary battery separator in accordance with an embodiment of the present invention had excellent heat resistance and also excellent battery performance such as ion permeability and a resistance maintaining property in a coin cell, due to having a "Weight ratio in mixed layer" of not less than 0.07.

INDUSTRIAL APPLICABILITY

A nonaqueous electrolyte secondary battery separator in accordance with an embodiment of the present invention can be suitably used even in an environment in which high heat resistance is required.

REFERENCE SIGNS LIST

1: Laminated body constituted by a residual porous base material and a mixed layer

5: Heat-resistant layer

7: Filler

The invention claimed is:

1. A nonaqueous electrolyte secondary battery separator comprising:

a mixed layer which contains a heat-resistant resin and a porous base material that includes a porous film containing a polyolefin-based resin in an amount of not less than 50% by volume relative to a total volume of components of the porous film, in the mixed layer, a weight ratio ($W_1/W_0$) between a weight $W_1$ of the heat-resistant resin and a weight $W_0$ of the porous base material being not less than 0.07, wherein a heat-resistant layer which contains the heat-resistant resin is formed on the mixed layer, wherein a value of expression (1) of the heat-resistant layer is not less than 5%:

$$\text{a luminance } X_1(\%) - \text{a luminance } X_2(\%) \tag{1}$$

where the luminance $X_1$ represents an average value of luminances of a part of the heat-resistant layer from an interface between the heat-resistant layer and the mixed layer to a depth of 20% of a thickness of the heat-resistant layer from the interface, the luminance $X_2$ represents an average value of luminances of a part of the heat-resistant layer from an outermost surface of the heat-resistant layer to a depth of 20% of the thickness of the heat-resistant layer from the outermost surface, and an average value of luminances of the entire heat-resistant layer is 100%.

2. The nonaqueous electrolyte secondary battery separator as set forth in claim 1, wherein a shutdown temperature of the nonaqueous electrolyte secondary battery separator is not lower than 150° C.

3. The nonaqueous electrolyte secondary battery separator as set forth in claim 1, wherein an air permeability of the nonaqueous electrolyte secondary battery separator is not more than 500 sec/100 mL.

4. The nonaqueous electrolyte secondary battery separator as set forth in claim 1, wherein the heat-resistant resin is an aramid resin.

5. The nonaqueous electrolyte secondary battery separator as set forth in claim 1, wherein the heat-resistant layer further contains a filler.

6. The nonaqueous electrolyte secondary battery separator as set forth in claim 5, wherein an amount of the filler contained in the heat-resistant layer is not less than 20% by weight and not more than 90% by weight, relative to a total weight of the heat-resistant layer.

7. A nonaqueous electrolyte secondary battery comprising a nonaqueous electrolyte secondary battery separator recited in claim 1.

8. A nonaqueous electrolyte secondary battery member comprising:

a positive electrode;

a nonaqueous electrolyte secondary battery separator recited in claim 1; and a negative electrode, the positive electrode, the nonaqueous electrolyte secondary battery separator, and the negative electrode being disposed in this order.

* * * * *